United States Patent [19]

Ogasawara et al.

[11] 3,893,867

[45] July 8, 1975

[54] MAGNESIA-BASE SINTERED ARTICLE AND PROCESS FOR PRODUCING THE SAME

[75] Inventors: Kiyoshi Ogasawara; Gentaro Kokubo, both of Tokyo; Takashi Hojo, Yokohama, all of Japan

[73] Assignee: Nihon Kaisuikako Co., Ltd., Tokyo, Japan

[22] Filed: Oct. 25, 1973

[21] Appl. No.: 409,472

[30] Foreign Application Priority Data
Oct. 25, 1972 Japan.............................. 47-106161

[52] U.S. Cl................... 106/58; 106/40 R; 106/63
[51] Int. Cl............................................. C04b 35/04
[58] Field of Search...................... 106/40 R, 58, 63

[56] References Cited
UNITED STATES PATENTS

| | | | |
|---|---|---|---|
| 3,174,881 | 3/1965 | McEvoy et al.................. | 106/40 R |
| 3,309,175 | 3/1967 | Berg et al......................... | 106/58 |
| 3,598,618 | 8/1971 | Fujii et al......................... | 106/40 R |
| 3,753,746 | 8/1973 | Koerner............................ | 106/40 R |

*Primary Examiner*—J. Poer
*Attorney, Agent, or Firm*—Woodhams, Blanchard and Flynn

[57] ABSTRACT

Finely divided magnesia or a substantially homogeneous mixture of finely divided magnesia with calcium oxide is blended with finely divided magnesium hydroxide or a mixture of both magnesium hydroxide and calcium hydroxide, and the resultant mixture is formed into a briquette. The thus prepared briquette is calcined to sinter same, thereby to produce a novel porous article having pores dispersed uniformly therein and having a low bulk density, high physical strength and excellent resistance to thermal shock. The approximate porosity value of the novel article can be predetermined by selection of the particle sizes and the blending ratios of the raw materials employed.

16 Claims, No Drawings

MAGNESIA-BASE SINTERED ARTICLE AND PROCESS FOR PRODUCING THE SAME

BACKGROUND OF THE INVENTION

1. FIELD OF THE INVENTION

This invention relates to a magnesia-base sintered article and a process for producing the same.

2. DESCRIPTION OF THE PRIOR ART

Sintered magnesia and sintered magnesia-base mixed oxides, such as sintered dolomite, are widely employed as structural components of basic refractories, because they have excellent refractory properties. However, the material produced by the conventional methods is a dense sintered article of low porosity. The use of this material as a starting material for the manufacture of refractory brick, for example, magnesia brick, results in a high weight per unit volume of the brick and also a heavy weight of any structure composed of the brick because of the high density of the sintered material. Furthermore, the field of use of the brick is limited because it has a disadvantageously low resistance to spalling.

In order to remove such disadvantages of the prior sintered articles, it has been proposed to make a cellulated and sintered body of magnesia as disclosed in U.S. Pat. No. 3,598,618. According to this prior art process, powder comprising magnesium oxide or magnesium hydroxide is brought into contact with droplets of acetic acid or a solution thereof, whereby the powder solidifies and simultaneously the resultant solid is foamed. Although the above mentioned foamed material is porous and light, the sintered material produced by calcining the foamed material to sinter same has a low compressive strength, for example, of at most 30 or 40 kg/cm², and therefore, it is not widely useful as a refractory material. In addition, the pores in the material are not uniformly distributed. Thus, a desirable, porous, light, magnesia-base sintered material or article has not as yet been produced on an industrial scale.

SUMMARY OF THE INVENTION

An object of this invention is to provide a magnesia-base sintered article having uniformly distributed pores, a low bulk density and relatively high compressive strength.

Another object of this invention is to provide a magnesia-base sintered article having relatively high compressive strength and a desired porosity.

A further object of this invention is to provide a process for producing a magnesia-base sintered object having pores dispersed uniformly through it and a desired porosity, without a significant decrease in compressive strength as compared with the dense objects produced by the prior art.

Additional objects, features and advantages of the invention will appear more fully from the following description.

DETAILED EXPLANATION OF THE INVENTION

The present invention is based on the discoveries that a magnesia-base sintered article having a desired porosity, which can be selected over a relatively wide range, can be prepared by the following procedure. That is,(1) finely divided magnesia or magnesia-base oxides, preferably dead burned magnesia or dolomite, is blended with (2) finely divided magnesium hydroxide or a substantially homogeneous mixture of magnesium hydroxide with calcium hydroxide, in a well blended state, preferably in a ratio ranging from about 20 to about 90% by weight, especially 20 to 80% by weight, of the former oxides (1), based on the total weight of the resultant blended mixture. The resultant blended mixture is formed into shapes and then is calcined to sinter, whereby a relatively high compressive strength of the magnesia-base sintered article is obtained. The sintered product is suitable for use in aggregates of basic refractories.

As the magnesia-base oxides used for the starting material in this invention, it is preferred to employ (a) dead burned magnesia clinker produced by burning magnesium hydroxide prepared by the conventional method by separating from sea water, naturally occuring magnesite or brucite; (b) dead burned dolomite produced by burning dolomite ore or a homogenized mixture of magnesium hydroxide with calcium hydroxide; or (c) similar magnesium oxide or magnesium oxide-calcium oxide materials.

When dead burned dolomite is employed, it is necessary that the magnesia content thereof is more than 70 weight percent.

The particle size of these magnesia-base oxides can be varied to control the desired properties of porosity, compression strength, dimensions, etc., of the sintered magnesia-base product. The desired particle size can be achieved by means of crushing, pulverizing, or the like, accompanied with optional size separation by screening. The porosity (percentage of open space in the total volume of the product) and the size of the pores of the product increase with an increase of the average particle size of the starting magnesia-base oxides, whereas the compressive strength exhibits an inverse tendency.

Generally, when the dimension of the intended porous magnesia-base sintered article is relatively small, for example, approximately 20 mm. such as a briquette, it is desirable to use a finely divided particle size, e.g. to pulverize the starting material magnesia-base oxides into a fine powder having a particle size of less than 1 mm., whereas when the article is to be of a larger dimension such as a brick, it is desireable to use a less finely divided particle size, e.g., to pulverize so that a substantial portion of the particles is from 1 to 10 mm. in size.

As the magnesium hydroxide to be blended with the starting magnesia-base oxides, there can be used magnesium hydroxide separated from sea water, naturally occuring brucite or the like.

The magnesium hydroxide is usually employed in a finely divided state having a particle size of less than 1 mm. When the size of the intended porous magnesia-base sintered article is employ small such as of less than 20 mm. in diameter, e.g., a briquette, it is desirable to employe more finely divided magnesium hydroxide, e.g., to pulverize the magnesium hydroxide into a powder of less than 0.5 mm. particle size. However, when the article has a larger dimension, such as a brick, the use of the magnesium hydroxide having particle size of less than 1 mm. is less preferable. When a homogenized mixture of magnesium hydroxide with calcium hydroxide is employed, the calcium hydroxide content must not exceed 30 weight % based on the weight of the mixture. The particle size of the calcium hydroxide is substantially the same as that of the magnesium hydroxide.

It is preferred that the magnesia or magnesia-base oxides, and the magnesium hydroxide or mixture of magnesium hydroxide and calcium hydroxide, each have a particle size of less than 50 mesh (Tyler screen size). It is further preferred that the magnesia or magnesia-base oxide comprises from 10 to 30 % by weight of particles having a size of less than 50 to more than 100 mesh size, from 30 to 60 % by weight of particles having a size of from less than 100 to more than 200 mesh size and the balance is particles having a mesh size of less than 200. It is also preferred that the magnesia or magnesia-base oxide contains from 20 to 70 % by weight of particles having a size of from less than 100 to more than 200 mesh size and the balance consists of particles of less than 200 mesh size.

Blending of the starting oxide with the hydroxide additive can be carried out by use of a conventional mixer. In any case, it is necessary to blend both materials homogeneously.

A binder agent can be added to the mixture so that the mixture can be molded more easily in the succeeding step. When the mixture contains substantially no calcium oxide, water is conveniently employed as the binder agent. Of course, any of the conventional binders such as clay, an inorganic magnesium salt, for example, magnesium chloride or sulfate, carboxymethyl cellulose and the like can be additionally incorporated. When the mixture contains a substantial amount of calcium oxide, a non-aqueous binder agent such as liquid paraffin can be employed in order to avoid slaking of the calcium oxide. For molding the blended mixture a conventional pressure molding machine, for example, a tabletting machine, a briquetting machine having two rolls, or the like, can be used.

Calcining the molded article can be carried out in a rotary kiln, a shaft kiln, a stationary gas-burning furnace, an electroresistance furnace or the like at a temperature ranging from about 1,400° to 2,000°C., preferably from 1,600° to 2,000°C. until the mixture is sintered. The magnesia-base sintered article, e.g., briquette, of this invention has a remarkably uniform pore distribution and a compressive strength of more than 100 kg/cm². The purity of the sintered magnesia briquette can be controlled by choosing raw materials of desired purity.

The porosity and the compressive strength can be adjusted to a substantially desired value over a broad range by controlling the particle size distribution and the blending ratio of the starting materials.

The magnesia-base sintered article of the present invention is useful as an aggregate for basic refractory materials. It is approximately 20% lower in bulk density as compared with a conventional aggregate consisting of sintered magnesia, and it is also lower in heat conductivity, while the compressive strength thereof is generally similar to that of the conventional aggregate.

The magnesis-base sintered article of this invention contains many pores which are effective for holding a chemical reaction catalyst, so that the product of the invention is useful as a catalyst carrier, especially as a basic carrier.

DESCRIPTION OF THE PREFERRED EMBODIMENTS

The present invention is further illustrated by the following nonlimitatives examples. In the examples, the mixing ratios and the percentages of the ingredients referred to are all "by weight" and the mesh sizes of particles are based on the Tyler mesh sizes.

EXAMPLE 1

A dead burned magnesia clinker having the chemical composition and the properties shown in Table 1, produced by calcining impure magnesium hydroxide at 1,800°C to sinter (the magnesium hydroxide having been prepared from sea water) was crushed, pulverized and sieved to obtain a powder of magnesia clinker passing through a 100 mesh screen. By further sieving, magnesia powder having a particle size distribution consisting of 30% of particles of 100 to 200 mesh size and the remaining 70% of particles of less than 200 mesh size, was prepared. The magnesia powder thus prepared was blended, in the ratios shown in Table 1, with magnesium hydroxide powder having a particle size distribution consisting of 20% of particles of magnesium hydroxide of from 100 to 200 mesh size and 80% of magnesium hydroxide particles of less than 200 mesh size. To the thus-prepared blended mixture, there was added 5% of water based on the total weight of the mixture, and the resultant mixture was molded into cyrindrical shapes of 40 mm. in diameter and 40 mm. in height under a molding pressure of 500 kg/cm² and then was calcined at 1,800°C to sinter.

The apparent porosity, bulk density and compressive strength of the thus-produced magnesia-base sintered articles are shown in Table 2 in relation to the blending ratios of the magnesia powder and the magnesium hydroxide employed.

Table 1

| | Compositions of Starting Materials | | | | | | | |
|---|---|---|---|---|---|---|---|---|
| | MgO (%) | Mg(OH)$_2$ (%) | CaO (%) | Fe$_2$O$_3$ (%) | Al$_2$O$_3$ (%) | SiO$_2$ (%) | Bulk density$^{(g/cm3)}$ | Apparent porosity (%) |
| Magnesia clinker | 95.44 | — | 1.10 | 0.13 | 0.12 | 3.01 | 3.26 | 2.0 |
| Magnesium hydroxide | — | 96.99 | 0.79 | 0.09 | 0.11 | 2.08 | | |

Table 2

| | Properties of Calcined Products | | | | | | | | |
|---|---|---|---|---|---|---|---|---|---|
| Blending ratio | Magnesia powder | 20 | 30 | 40 | 50 | 60 | 70 | 80 | 90 |
| | Magnesium hydroxide powder | 80 | 70 | 60 | 50 | 40 | 30 | 20 | 10 |
| Porosity (%) | | 23 | 32 | 33 | 35 | 32 | 28 | 25 | 22 |
| Bulk density (g/cm³) | | 2.71 | 2.42 | 2.38 | 2.32 | 2.40 | 2.56 | 2.61 | 2.70 |
| Compressive strength (kg/cm²) | | 165 | 130 | 140 | 180 | 150 | 130 | 190 | 330 |

It was observed that the pores of the magnesia-base sintered articles were less than 0.5 mm. in diameter and they were uniformly dispersed.

EXAMPLE 2

Although the magnesia-base sintered briquette articles produced in Example 1 had a maximum porosity of 35%, a higher porosity can be achieved by controlling the particle size distribution of the starting materials used as follows.

Dead burned magnesia powder consisting of 60% of particles of 100 to 200 mesh size and 40% of less than 200 mesh size was prepared from the dead burned magnesia clinker used in Example 1 in a manner similar to that described in Example 1. 60 Parts of this magnesia powder was blended with 40 parts of the magnesium hydroxide powder used in Example 1. The resultant mixture was shaped and calcined in the same manner as in Example 1. The magnesia-base sintered articles thus produced had a porosity of 53%, and a compressive strength of 120 kg/cm$^2$.

EXAMPLE 3

Synthetic dolomite burned at 1,750°C. comprised at 70% of MgO, 28% of CaO and the balance impurities, was crushed and sieved to produce a powder consisting of 20% of particles of 50 to 100 mesh size, 50% of particles of 100 to 200 mesh size and 20% of the particles of less than 200 mesh size. 60 Parts of this dolomite powder was blended with 40 parts of a substantially uniform mixture which consisted of 73% of finely pulverized magnesium hydroxide and 27% of finely pulverized calcium hydroxide, both hydroxides being of less than 200 mesh in particle size. After the addition of liquid paraffin into the thus-blended mixture in an amount of 5% based on the weight of the mixture, the resultant mixture was molded into cylindrical shapes of 40 mm. in diameter and 40 mm. in height under a molding pressure of 500 kg/cm$^2$, and then was calcined to sinter.

The magnesia-base sintered articles thus produced had a porosity of 43% and a compressive strength of 218 kg/cm$^2$ and were useful as a tower packing or catalyst support.

EXAMPLE 4

Pulverized magnesia clinker, produced by burning at 1,800°C. magnesium hydroxide prepared from sea water, was blended with pulverized magnesium hydroxide also prepared from sea water with or without further addition of a binder agent to prepare test mixtures. The resultant blended mixtures were molded by means of pressure molding followed by calcining to sinter at 1,800°C.

The physical properties of the thus-obtained magnesia-base sintered articles are shown in Table 3, together with the chemical compositions, physical properties and the blending ratios of the two powders; the amount and type of the binder agent; the dimensions of the shaped articles; and the molding pressure.

Table 3

| Sample No. | | | 1 | 2 | 3 |
|---|---|---|---|---|---|
| Composition and properties of dead burned magnesia clinker (starting material) | Chemical composition (%) | MgO | 95.12 | 95.12 | 95.02 |
| | | CaO | 1.28 | 1.28 | 1.22 |
| | | Fe$_2$O$_3$ | 0.22 | 0.22 | 0.24 |
| | | Al$_2$O$_3$ | 0.50 | 0.50 | 0.47 |
| | | SiO$_2$ | 2.68 | 2.68 | 2.85 |
| | Physical properties | Bulk density (g/cm$^3$) | 3.27 | 3.27 | 3.26 |
| | | Apparent porosity (%) | 1.5 | 1.5 | 3.0 |
| | Particle size distribution | More than 100 mesh (%) | 0 | 0 | 0 |
| | | 100 to 200 mesh (%) | 10 | 40 | 30 |
| | | Less than 200 mesh | 90 | 60 | 70 |
| Composition and properties of magnesium hydroxide (starting material) | Chemical composition (%) | Mg(OH)$_2$ | 97.21 | 97.21 | 97.97 |
| | | CaO | 0.88 | 0.88 | 0.79 |
| | | Fe$_2$O$_3$ | 0.20 | 0.20 | 0.08 |
| | | Al$_2$O$_3$ | 0.31 | 0.31 | 0.15 |
| | | SiO$_2$ | 1.40 | 1.40 | 1.01 |
| | Particle size distribution | More than 100 mesh (%) | 0 | 0 | 0 |
| | | 100 to 200 mesh (%) | 30 | 10 | 20 |
| | | Less than 200 mesh (%) | 70 | 90 | 80 |
| Mixing ratio of the powder of magnesia clinker to the powder of magnesium hydroxide (by weight) | | | 30/70 | 50/50 | 40/60 |

Table 3 — Continued

| Sample No. | | 1 | 2 | 3 |
|---|---|---|---|---|
| Binder agent and amount (%) thereof, based on powder mixture | | none | An aqueous solution of magnesium chloride of 25° Be 5 | An aqueous solution of magnesium sulfate of 30° Be 2 |
| Dimension of the shaped body | | 30 mm.Φx 30 mm. | 40 mm.Φx 40 mm. | 30 mm.Φx 30 mm. |
| Molding pressure (kg/cm²) | | 1,000 | 700 | 300 |
| Properties of the magnesia-base sintered article | Porosity (%) | 34 | 38 | 36 |
| | Bulk density (g/cm³) | 2.32 | 2.19 | 2.27 |
| | Compressive strength (kg/cm²) | 145 | 130 | 115 |

Comparative Test

Magnesia powder and magnesium hydroxide powder, the same as used in Example 1, were respectively shaped alone and calcined under the conditions of Example 1 except that the two powders were not blended.

The properties of the thus-obtained sintered articles are shown in Table 4.

Table 4

| | Shaped and sintered article prepared from only magnesia powder | Shaped and sintered article prepared from only magnesium hydroxide powder |
|---|---|---|
| Porosity (%) | 17 | 2 |
| Bulk density (g/cm³) | 2.88 | 3.28 |
| Compressive strength (kg/cm²) | 380 | 320 |

In both cases, the articles could not be characterized as being significantly porous.

The articles of this invention, mixed, molded and sintered as described above, can be in the form of briquettes, bricks or other conventional useful material for structural purposes such as brick for furnace linings, shaped containers, furnace insulation, refractory aggregates and the like.

The embodiments of the the present invention in which an exclusive property or privilege is claimed are defined as follows:

1. A process for producing a light and porous magnesia-base sintered article comprising blending a finely divided first component selected from the group consisting of magnesia and a substantially homogeneous mixture of magnesia and calcium oxide containing at least 70 % by weight of magnesia, with a finely divided second component selected from the group consisting of magnesium hydroxide and a substantially homogeneous mixture of magnesium hydroxide with calcium hydroxide containing at least 70 % by weight of magnesium hydroxide, to form a uniformly blended mixture containing from 20 to 90 % by weight of said first component and the balance of said mixture consists essentially of said second component, forming the thus-blended mixture into a shaped article and calcining the article at a temperature in the range of from about 1,400°C to about 2,000°C to form a sintered product.

2. The process according to claim 1 wherein the said first component consists essentially of dead burned magnesia and the said second component consists essentially of magnesium hydroxide.

3. The process according to claim 2 wherein the said first component and the said second component each have a particle size of less than 1 mm., and the calcining is carried out at 1,600°to 2,000°C.

4. The process according to claim 1 wherein said first and second components are blended in a dry state, and in the forming step a binder agent is blended into said mixture and the resulting composition is molded under pressure.

5. The process according to claim 2 wherein said first and second components are blended in a dry state, and in the forming step a binder agent is blended into said mixture and the resulting composition is molded under pressure and the calcining is carried out at 1,600° to 2,000°C.

6. The process according to claim 5 wherein the binder agent is selected from the group consisting of water, clay, magnesium chloride, magnesium sulfate, carboxymethyl cellulose, liquid paraffin and mixtures thereof.

7. The process according to claim 1, wherein the said first component consists essentially of dead burned dolomite clinker and said second component consists essentially of magnesium hydroxide.

8. The process according to claim 7 wherein said first and second components are blended in a dry state, and in the forming step a non-aqueous binder agent is blended into said mixture and the resulting composition is molded under pressure.

9. The process according to claim 8 wherein the non-aqueous binder agent is liquid paraffin and the said dead burned dolomite clinker and the said magnesium hydroxide each have a particle size of less than 1 mm.

10. The process according to claim 1 wherein said first component consists essentially of dead burned dolomite clinker having a magnesia content of at least 70% by weight and the said second component consists essentially of a substantially homogeneous mixture of magnesium hydroxide with calcium hydroxide having a magnesium hydroxide content of at least 70% by weight.

11. The process according to claim 10 wherein said first and second components are blended in a dry state, and in the forming step liquid paraffin is blended into said mixture as a binder agent and the resulting composition is molded under pressure, and the calcining is carried out at 1,600° to 2,000°C.

12. The process according to claim 1, in which the first component and the second component each have a particle size of less than 50 mesh (Tyler screen size).

13. The process according to claim 12, in which the first component consists of a mixture of from 10 to 30 % by weight of particles having a size of from less than 50 to more than 100 mesh size, from 30 to 60 % by weight of particles having a size of from less than 100 to more than 200 mesh size and the balance is particles having a mesh size of less than 200.

14. The process according to claim 12, in which the first component contains from 20 to 70 % by weight of particles having a size of from less than 100 to more than 200 mesh size and the balance consists of particles of less than 200 mesh size.

15. The process according to claim 13 in which the size of the particles of the second component is not larger than the size of the particles of the first component.

16. The process according to claim 14 in which the size of the particles of the second component is not larger than the size of the particles of the first component.

* * * * *